(12) United States Patent
Oberle et al.

(10) Patent No.: US 10,860,980 B2
(45) Date of Patent: *Dec. 8, 2020

(54) ESTABLISHING A COMMUNICATION EVENT

(71) Applicant: Microsoft Technology Licensing, LLC, Redmond, WA (US)

(72) Inventors: Vincent Marc Oberle, Tallinn (EE); Lindsay Simon Roberts, Tallinn (EE); Tyler Wells, Saratoga, CA (US); Jonathan David Rosenberg, Freehold, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/656,960

(22) Filed: Oct. 18, 2019

(65) Prior Publication Data

US 2020/0051024 A1 Feb. 13, 2020

Related U.S. Application Data

(63) Continuation of application No. 15/971,032, filed on May 4, 2018, which is a continuation of application
(Continued)

(51) Int. Cl.
*H04L 12/58* (2006.01)
*G06Q 10/10* (2012.01)
*H04M 7/00* (2006.01)

(52) U.S. Cl.
CPC .......... *G06Q 10/10* (2013.01); *H04L 51/28* (2013.01); *H04M 7/0024* (2013.01); *H04L 51/32* (2013.01); *H04M 2203/655* (2013.01)

(58) Field of Classification Search
CPC ........ G06Q 10/10; G06Q 50/01; H04L 51/28; H04L 51/32; H04L 29/12198;
(Continued)

(56) References Cited

U.S. PATENT DOCUMENTS 8,005,897 B1 * 8/2011 Roka .................. G06Q 10/10
709/205
8,954,500 B2 2/2015 Marlow et al.
(Continued)

FOREIGN PATENT DOCUMENTS

CN 102629919 A 8/2012

OTHER PUBLICATIONS

"Applicant Initiated Interview Summary Issued in U.S. Appl. No. 15/971,032", dated Feb. 18, 2020, 4 Pages.
(Continued)

*Primary Examiner* — Aftab N. Khan
(74) *Attorney, Agent, or Firm* — Schwegman Lundberg & Woessner, P.A.

(57) ABSTRACT

Methods and computer program products for establishing communication events between an initiator user and a recipient user over a first communication system. The initiator and recipient users are contacts within a second communication system but are not contacts within the first communication system. For the initiator and recipient users, an association between a first user identity in the first communication system and a second user identity in the second communication system is determined. The initiator user device uses the association for the recipient user to determine the first user identity of the recipient user. A setup request to establish the communication event is sent over the first communication system from a first initiator client to a first recipient client. A communication event is authorized to proceed over the first communication system on the basis that the initiator
(Continued)

user and the recipient user are contacts within the second communication system.

28 Claims, 3 Drawing Sheets

Related U.S. Application Data

No. 13/611,635, filed on Sep. 12, 2012, now Pat. No. 10,089,603.

(58) Field of Classification Search
CPC .......... H04L 29/12122; H04L 61/1594; H04L 61/1547; H04L 12/588; H04M 7/0024; H04M 2203/655

See application file for complete search history.

(56) References Cited

U.S. PATENT DOCUMENTS

| | | | |
|---|---|---|---|
| 2003/0149781 A1* | 8/2003 | Yared | H04L 63/0815 709/229 |
| 2005/0216550 A1* | 9/2005 | Paseman | G06Q 10/00 709/202 |
| 2008/0205655 A1* | 8/2008 | Wilkins | G06Q 10/10 380/279 |
| 2008/0291839 A1* | 11/2008 | Hooper | H04L 43/0811 370/248 |
| 2009/0177744 A1* | 7/2009 | Marlow | G06Q 10/10 709/204 |
| 2010/0057643 A1* | 3/2010 | Yang | G06Q 10/10 706/11 |
| 2010/0274815 A1* | 10/2010 | Vanasco | G06Q 10/107 707/798 |
| 2011/0055234 A1* | 3/2011 | Miettinen | G06F 16/90344 707/755 |
| 2011/0119230 A1* | 5/2011 | Zuber | G06Q 10/10 707/608 |
| 2012/0198348 A1* | 8/2012 | Park | G06F 3/0488 715/739 |
| 2013/0176895 A1* | 7/2013 | McEachern | H04L 12/56 370/254 |

OTHER PUBLICATIONS

"First Office Action and Search Report Issued in Chinese Patent Application No. 201810526568.5", dated Aug. 3, 2020, 21 Pages.

* cited by examiner

ESTABLISHING A COMMUNICATION EVENT

RELATED APPLICATION

This application is a continuation application of U.S. patent application Ser. No. 15/971,032, filed May 4, 2018, which application is a continuation application of U.S. patent application Ser. No. 13/611,635, filed Sep. 12, 2012; the disclosures of which are incorporated herein by reference in their entirety.

BACKGROUND

The Internet is used to provide a variety of different forms of communication between users. Different communication systems may be operated by different software providers, wherein different applications may be implemented at a user device to enable a user of the user device to communicate over the different communication systems. The different communication systems may be managed and operated independently.

For example, a first software provider may offer a first voice and/or video over internet protocol ("VoIP") client, which may become very popular with a large number of users communicating with each other via this VoIP client over a first communication system. Similarly, a second software provider may offer a second VoIP client (or some other application allowing communication across the Internet), which may also become very popular with a large number of users and which enables communication over a second communication system. To gain the benefit of both these services, a user runs both the two VoIP clients separately at his user device. Furthermore, the user maintains separate contact lists for each of the two services. A user is identified in each communication system using a respective user identifier (ID). An ID of a user in a first communication system may be different to an ID of the user in a second communication system. The IDs may, for example, be email addresses or other user names which are unique to the user within the respective communication systems, thereby allowing the users to be uniquely identified within each of the communication systems.

In order for two users to communicate with each other across the communication systems, the communication systems may require that there is a contact relationship between the two users. For example, each user may have a respective contact list of his contacts within each of the communication systems. When users are contacts of one another within a communication system, they are authorised to communicate with one another over that communication system. However, when users are not contacts of one another within a communication system, they are not authorised to communicate with one another over that communication system. In one example, two users are not contacts of one another within a first communication system, but are contacts of one another within a second communication system. The two users can therefore communicate with each other over the second communication system. However, before the two users can communicate with each other over the first communication system they would first add each other as contacts within the first communication system, such that communication between the two users is authorized to proceed over the first communication system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of establishing a communication event between an initiator user and a recipient user over a first communication system which requires users to have a contact relationship to communicate with one another, wherein the initiator user and the recipient user are contacts of one another within a second communication system but are not contacts of one another within the first communication system. A first initiator client is implemented at an initiator user device which enables the initiator user to access the first communication system, and a first recipient client is implemented at a recipient user device which enables the recipient user to access the first communication system. For each of the initiator user and the recipient user, an association between a first user identity in the first communication system and a second user identity in the second communication system is determined. At the initiator user device, contact details within the second communication system are accessed to determine the second user identity of the recipient user. The determined second user identity of the recipient user and said association for the recipient user are used to determine the first user identity of the recipient user. A setup request to establish the communication event is sent over the first communication system from the first initiator client to the first recipient client, wherein the setup request is sent using the determined first identity of the recipient user. Information is provided to the first recipient client indicating that the first identity of the initiator user is associated with the second identity of the initiator user, and the communication event is authorized to proceed over the first communication system between the first initiator client and the first recipient client on the basis that the initiator user and the recipient user are contacts of one another within the second communication system.

Therefore the first clients, which enable the initiator user and the recipient user to communicate over the first communication system, trust each other based on the contact relationship between the initiator user and the recipient user within the second communication system. This is achieved without the initiator user and the recipient user being contacts within the first communication system.

BRIEF DESCRIPTION OF THE DRAWINGS

For a better understanding of the described embodiments and to show how the same may be put into effect, reference will now be made, by way of example, to the following drawings in which.

DETAILED DESCRIPTION

Figure 1:
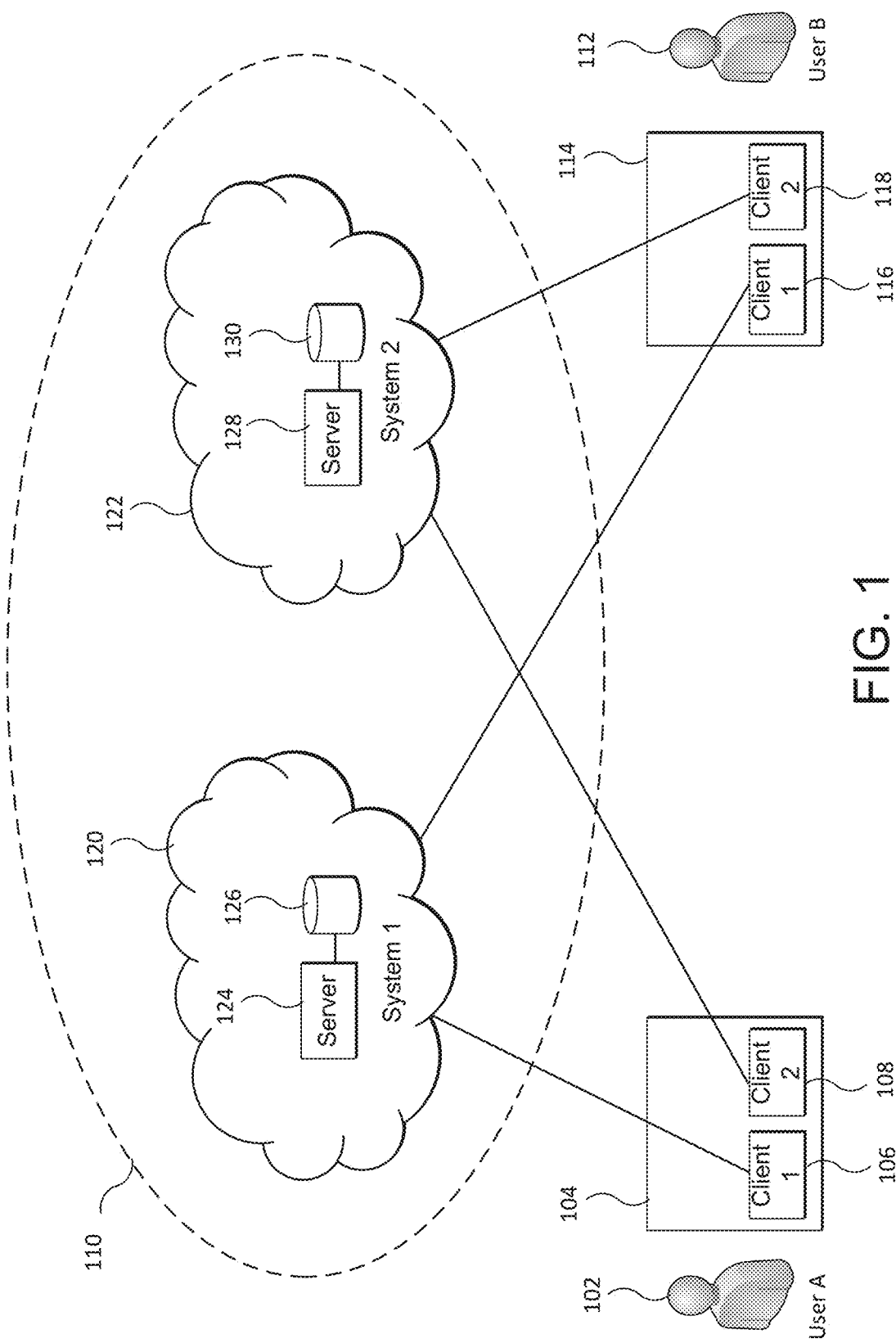
FIG. 1 shows a schematic illustration of an arrangement involving a packet-based network in accordance with one or more embodiments.

Reference is first made to FIG. 1, which illustrates an arrangement which enables two users to communicate with each other. A first user (denoted "User A" 102) operates a user device 104, which is connected to a network 110, such as the Internet. A second user (denoted "User B" 112) operates a user device 114, which is connected to the network 110. Each of the user devices 104 and 114 may be, for example, a mobile phone, a tablet, a personal computer ("PC"), a personal digital assistant ("PDA"), a gaming device, a television or other embedded device able to connect to the network 110. The user devices 104 and 114 are connected to the network 110 via respective network interfaces such as modems, and the connections between the user devices 104 and 114 and the respective network interfaces may be via cable (wired) connections or wireless connections.

A first communication system 120 and a second communication system 122 are operated in the network 110. The first and second communication systems 120 and 122 may be operated and managed independently of each other by respective communication service providers.

The user device 104 is running a first client 106. The client 106 is configured to interact with the first communication system 120. For example, the client 106 may be provided by a software provider associated with the first communication system 120. The client 106 is a software program executed on a local processor in the user device 104, which enables the user 102 to communicate over the first communication system 120. The user device 104 is also running a second client 108. The client 108 is configured to interact with the second communication system 122. For example, the client 108 may be provided by a software provider associated with the second communication system 122. The client 108 is a software program executed on a local processor in the user device 104, which enables the user 102 to communicate over the second communication system 122.

Similarly, the user device 114 is running a first client 116. The client 116 is configured to interact with the first communication system 120. For example, the client 116 may be provided by a software provider associated with the first communication system 120. The client 116 is a software program executed on a local processor in the user device 114, which enables the user 112 to communicate over the first communication system 120. The user device 114 is also running a second client 118. The client 118 is configured to interact with the second communication system 122. For example, the client 118 may be provided by a software provider associated with the second communication system 122. The client 118 is a software program executed on a local processor in the user device 114, which enables the user 112 to communicate over the second communication system 122.

Note that, in practice, there may be a very large number of users connected to the communication systems 120 and 122 via respective user devices, but these are not illustrated in FIG. 1 for clarity.

Within the first communication system 120 there is implemented a server 124 which can provide centralised functionality within the communication system 120. Although only one server in the first communication system 120 is shown in FIG. 1 and is referred to herein, there may be multiple servers in the communication system 120, wherein the functionality of the server 124 described herein may be implemented by multiple servers in the first communication system 120. The server 124 is connected to a data store 126 within the first communication system 120, which can store details of users of the communication system 120. For example, contact lists of the users of the communication system 120 may be stored in the data store 126.

Similarly, within the second communication system 122 there is implemented a server 128 which can provide centralised functionality within the communication system 122. Although only one server in the second communication system 122 is shown in FIG. 1 and is referred to herein, there may be multiple servers in the communication system 122, wherein the functionality of the server 128 described herein may be implemented by multiple servers in the second communication system 122. The server 128 is connected to a data store 130 within the second communication system 122, which can store details of users of the communication system 122. For example, contact lists of the users of the communication system 122 may be stored in the data store 130.

Figure 2:
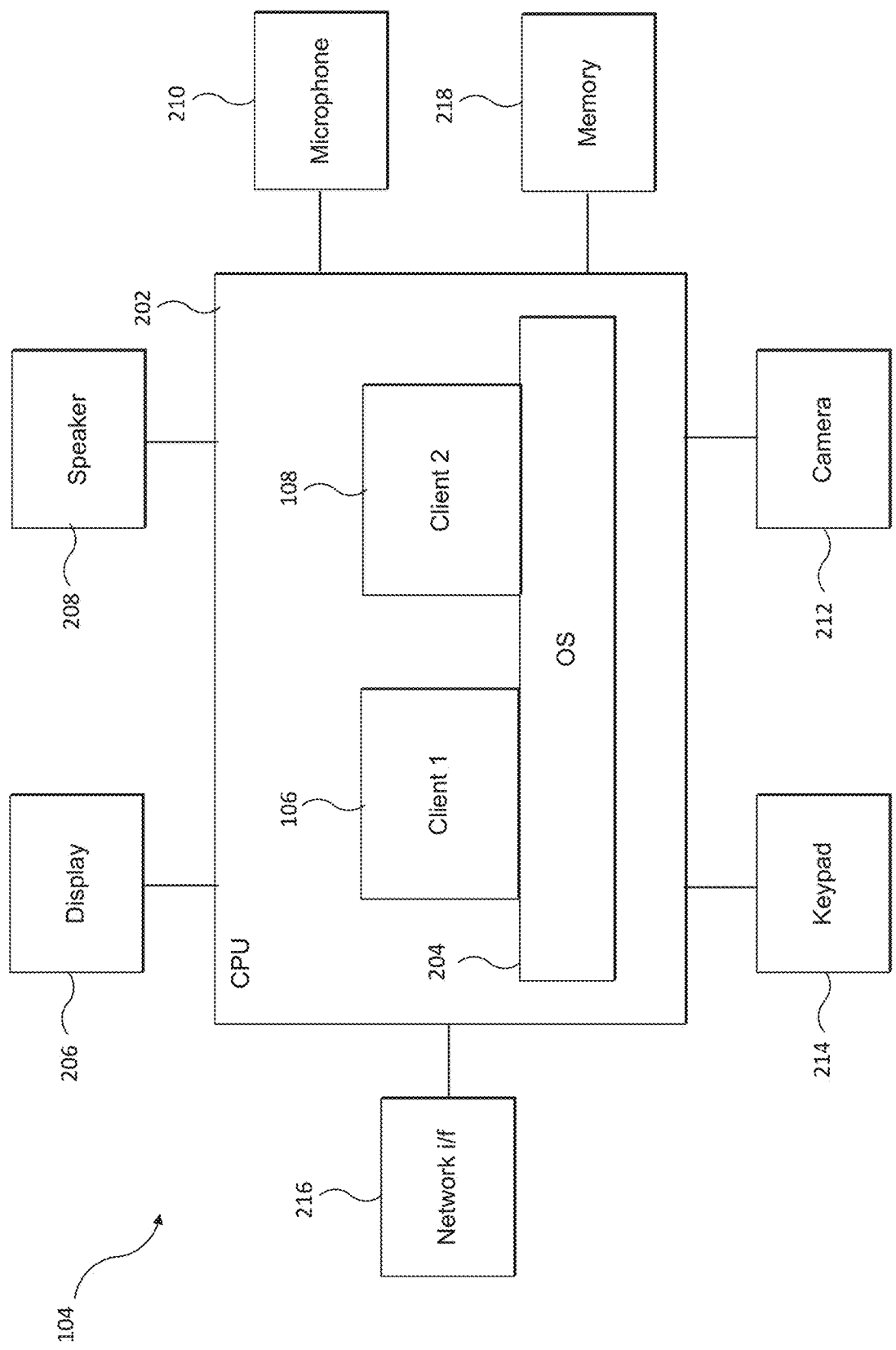
FIG. 2 is a schematic block diagram of client applications running on a user device in accordance with one or more embodiments.

FIG. 2 illustrates a detailed view of the user device 104 on which are executed clients 106 and 108. The user device 104 comprises a central processing unit ("CPU") 202, to which is connected: output devices such as a display 206 (e.g. a screen which may be implemented as a touch screen thereby also acting as an input device) and a speaker 208; input devices such as a microphone 210, a camera 212 and a keypad 214; a network interface 216; and a memory 218 for storing data at the user device 104. The display 206, speaker 208, microphone 210, camera 212, keypad 214, network interface 216 and memory 218 may be integrated into the user device 104 as shown in FIG. 2. In alternative user devices one or more of the display 206, speaker 208, microphone 210, camera 212, keypad 214, network interface 216 and memory 218 may not be integrated into the user device 104 and may be connected to the CPU 202 via respective interfaces. One example of such an interface is a USB interface.

FIG. 2 also illustrates an operating system ("OS") 204 executed on the CPU 202. In the example shown in FIG. 2, running on top of the OS 204 are the client 106 and the client 108. Each of the clients may comprise a protocol layer, a client engine layer and a client user interface ("UI") layer. Each layer is responsible for specific functions. Because each layer usually communicates with two other layers, they are regarded as being arranged in a stack. The operating system 204 manages the hardware resources of the computer and handles data being transmitted to and from the clients 106 and 108, and to and from the network 110 via the network interface 216. The client protocol layer of the client software communicates with the operating system 204 and manages the communication connections over the respective communication system (120 or 122). Processes requiring higher level processing are passed to the client engine layer. The client engine layer also communicates with the client user interface layer. The client engine layer may be arranged to control the client user interface layer to present information to the user 102 via the user interface of the client and to receive information from the user 102 via the user interface.

User device 114 has corresponding elements to user device 104, and is implemented in a corresponding way.

According to methods described herein the user 102 is allowed to establish a communication event (e.g. an audio call, a video call, an instant messaging (IM) session, or a file transfer) with the user 112 over the first communication system 120 when the two users (102 and 112) are not contacts within the first communication system 120 but are contacts within the second communication system 122. A trust policy required by the client 106 to enable the users 102 and 112 to communicate with each other over the first communication system 120 may be satisfied if the users 102 and 112 are trusted contacts on the second communication system 122.

The user 102 may be an "initiator user" for a communication event meaning that he sends a setup request to the user 112 (who is a "recipient user" for the communication event). The user 102 can establish a communication event with the user 112 over the first communication system 120 without having to add the user 112 as a contact within the first communication system 120. There are advantages for the user 102 to not having to add the second user 112 as a contact within the first communication system 120, such as maintaining a manageable contact list size and control of information that may be disseminated only to contacts, e.g. presence, mood messages etc.

Figure 3:
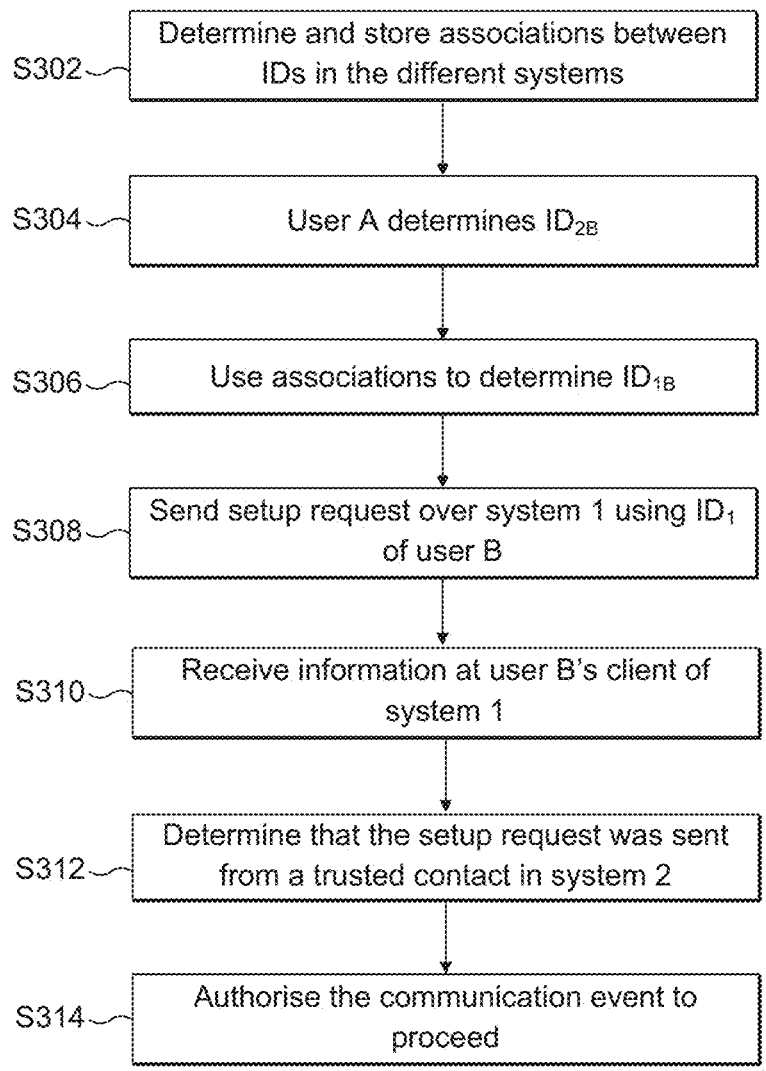
FIG. 3 is a flow chart for a process of establishing a communication event in accordance with one or more embodiments.

With reference to FIG. 3 there is now described a method of establishing a communication event.

In step S302, associations between the users' IDs in the different communication systems are determined. In particular, an association between user A's ID in the first communication system 120 (herein referred to as "$ID_{1A}$") and user A's ID in the second communication system 122 (herein referred to as "$ID_{2A}$") is determined. The determined association therefore indicates that $ID_{1A}$ and $ID_{2A}$ relate to the same user, i.e. to user A 102. Similarly, an association between user B's ID in the first communication system 120 (herein referred to as "$ID_{1B}$") and user B's ID in the second communication system 122 (herein referred to as "$ID_{2B}$") is determined. The determined association therefore indicates that $ID_{1B}$ and $ID_{2B}$ relate to the same user, i.e. to user B 112.

The associations may be determined using any suitable network element, such as the server 128 of the second communication system 122, or the server 124 of the first communication system 120, or any one of the clients implemented at the user devices 104 or 114.

An association between a user's IDs in the different communication systems links the user's accounts in the different communication systems together. As an example, in order for the user 102 to link his accounts in the different communication systems 120 and 122, he can use a web browser implemented at the user device 104 to go to a web page associated with one of the communication systems (120 and 122), and then the user 102 can prove he owns his two IDs in the respective communication systems 120 and 122 (that is, $ID_{1A}$ and $ID_{2A}$), for example by entering respective passwords for the two accounts. If the passwords are valid then his two accounts are linked, i.e. the association is determined between the user's IDs in the respective communication systems and the association (or "link") may be stored in a data store of a server of either or both of the communication systems (e.g. one or both of data stores 126 and 130). The user 112 can perform a corresponding process to link his accounts in the respective communication systems 120 and 122.

In embodiments described herein the linking (i.e. the determining of the associations) is a manual step, e.g. performed by the users. In these embodiments, if a user has not explicitly linked his accounts in the respective communication systems (120 and 122), then the association between his IDs in the respective communication systems is not determined.

The determined associations are stored in a data store, for example in the data store 130 or the data store 126. The determined associations may be stored in memory 218 at the user device 104 and/or in a memory at the user device 114.

The associations may be determined for each user who is a user of both the first communication system 120 and the second communication system 122. The determined associations link a user's (e.g. user 102) account in the first communication system 120 to the user's account in the second communication system 122. The linking allows the user 102 to prove to the first communication system 120 that he is the owner of another identity ($ID_{2A}$) in the second communication system 122. With this proof, users who only know user 102 with the other identity ($ID_{2A}$) may be authorized to communicate with the user 102 over the first communication system 120.

User A 102 is a contact of user B 112 in the second communication system 122 but is not a contact of user B 112 in the first communication system 120. However, the functionality provided in the two communication systems may not be the same, and as such, the user 102 may decide that he would like to establish a communication event with the user 112 over the first communication system 120 (rather than over the second communication system 122). In step S304, user A 102 determines the ID of user B 112 in the second communication system 122 ($ID_{2B}$). Since user B 112 is a contact of user A 102 within the second communication system 122, user A 102 can determine the ID of user B in the second communication system 122 ($ID_{2B}$) by accessing his contact list for the second communication system 122. The contact list will show the IDs in the second communication system 122 for all of the contacts of user A 102 (within the second communication system 122). As described above, the contact list may be stored in the data store 130, in which case step S304 comprises the user device 104 (e.g. using the client 108) retrieving $ID_{2B}$ from the data store 130, e.g. via the server 128. The contact list may be stored in the memory 218 (or some other data store at the user device 104), in which case step S304 comprises retrieving $ID_{2B}$ from the memory 218.

In step S306, the associations that were determined and stored in step S302 are retrieved from the data store in which they were stored and used to determine the ID of user B 112 in the first communication system 120 ($ID_{1B}$). As described above, users A and B (102 and 112) are not contacts within the first communication system 120, and so user A 102 cannot retrieve the ID of the user B 112 in the first communication system 120 ($ID_{1B}$) from his contact list for the first communication system 120. However, the client 106 can determine $ID_{1B}$ based on $ID_{2B}$ (as determined in step S304) and the association between $ID_{1B}$ and $ID_{2B}$ (as determined in step S302).

In this way the client 106 can address messages to the user 112 over the first communication system 120 using the determined ID of the user 112 in the first communication system 120 ($ID_{1B}$). Since the users A and B (102 and 112) are contacts within the second communication system 122, the client 106 has the required trust (associated with a contact relationship) to send messages over the first communication system 120 to the client 116.

As described above, the determined associations may be stored in the data store 130, the data store 126, in memory 218 at the user device 104 and/or in a memory at the user device 114. If the determined associations are stored in the data store 130 or the data store 126 then in step S306 the client 106 can retrieve the determined associations from the relevant data store. Therefore, the client 106 can retrieve the determined association for the user 112 even when the user 112 is not currently online. If the determined association for the user 112 is stored in a data store at the user device 114 then the association may be provided to the client 106 in a presence document sent from the user device 114 to the user device 104. In this case, the client 106 may only be able to access the determined association for the user 112 when both the users (102 and 112) are online in at least one of the communication systems 120 and 122.

The precise mechanism by which user A 102 can determine that user B 112 is a contact of his within the second communication system 122 depends upon the implementation of the communication system 120 and/or the communication system 122.

For example, in order for users to communicate over the first communication system 120, the users may be required to exchange certificates (e.g. issued by a server, such as server 124, in the first communication system 120) to prove their identities to each other within the first communication system 120. An indicator of a user's ID in the second communication system 122 (that is, $ID_2$) may be included with the certificate that is exchanged in the first communication system 120. The inclusion of the indicator of $ID_2$ with the certificate allows the recipient of the certificate to determine the $ID_2$ of the initiator user in the second communication system 122. This $ID_2$ can be checked against the recipient user's contact list in the second communication system 122 to determine that the initiator user is a contact of the recipient user in the second communication system 122.

In another example, the distribution of presence documents between contacts in the second communication system 122 is used. A presence document may be sent between contacts when both contacts are online in a communication system and indicates the presence status of a user (e.g. as "online", "busy", "away", etc). When a presence document is sent in the first communication system from user A 102 to user B 112, the ID of user A 102 in the second communication system 122 ($ID_{2A}$) may be included in the presence document. Similarly, when a presence document is sent in the first communication system 120 from user B 112 to user A 102, the ID of user B 112 in the second communication system 122 ($ID_{2B}$) may be included in the presence document. Furthermore, when a presence document is sent in the second communication system 122 from user A 102 to user B 112, the ID of user A 102 in the first communication system 120 ($ID_{1A}$) may be included in the presence document. Similarly, when a presence document is sent in the second communication system from user B 112 to user A 102, the ID of user B 112 in the first communication system 120 ($ID_{1B}$) may be included in the presence document. In this way, contacts within one communication system provide each other with their IDs in another communication system, thereby allowing the IDs to be linked.

In another example, the associations between the IDs of the users are stored centrally in a data store of a server in either the first or the second communication system (e.g. in server 124 or server 128). Then in order to determine the association between the IDs of the user B 112 (that is, the association between $ID_{1B}$ and $ID_{2B}$) the user device 104 (e.g. using the client 106 or the client 108) can query the relevant server in either the first or the second communication system to determine the association between $ID_{1B}$ and $ID_{2B}$.

In step S308, a setup request is sent from the client 106 to the client 116 over the first communication system 120. The setup request is addressed using the ID of the user 112 in the first communication system 120 (that is, $ID_{1B}$). The setup request is a request to establish a communication event over the first communication system 120 between the client 106 and the client 116. The setup request may be a request for the user 112 to engage in an audio call, a video call, an instant messaging session or a file transfer with the user 102. The communication session may include more users than the users 102 and 112. For example, the request to establish a communication event with the user 112 may be an invite for the user 112 to join a multi-party communication event, such as a conference call (audio or video) or a multi-party instant messaging session (a "multichat"). The setup request is sent according to the protocol implemented by the first communication system 120. The setup request will include the ID of the user 102 in the first communication system 120 (that is, $ID_{1A}$) to enable the client 116 to respond to the setup request by sending a message (e.g. accepting or rejecting the setup request) back to the client 106 over the first communication system 120.

In step S310 the client 116 at the user device 114 receives information indicating that the ID of the user 102 in the first communication system 120 (that is, $ID_{1A}$) is associated with the ID of the user 102 in the second communication system 122 (that is, $ID_{2A}$). The information received in step S310 allows the client 116 to determine, in step S312, that the setup request was sent by a user who is a contact of the user 112 in the second communication system 122. That is, the information received in step S310 indicates that, although the setup request was sent from an ID in the first communication system 120 which does not relate to a contact of the user 112 in the first communication system 120, the setup request is from a user who can be trusted. The trust is based on the users 102 and 112 being contacts of one another within the second communication system 122.

Step S310 may comprise including, in the setup request, the ID of user A 102 in the second communication system 122 (that is, $ID_{2A}$). In this case, the user device 114 (e.g. using client 118) can access the contact list of the user 112 within the second communication system 122 to determine that $ID_{2A}$ is an ID of a contact of the user 112 within the second communication system 122.

Step S310 may comprise retrieving the associations that were determined and stored in step S302. As described above, the determined associations may have been stored in the data store 130 or in memory at the user device 114. The setup request received from client 106 will indicate the ID of the user 102 in the first communication system 120 (that is, $ID_{1A}$) in accordance with the protocols of the first communication system 120. Therefore, the client 116 can use the association for the user 102 between $ID_{1A}$ and $ID_{2A}$ and the received $ID_{1A}$ to determine $ID_{2A}$. It can therefore be determined in step S312 that $ID_{2A}$ is an identifier of a user who is a contact of user 112 in the second communication system 122.

In step S314 the client 116 authorises the communication event to proceed over the first communication system 120 between the clients 106 and 116 (and any other clients involved in the communication event when the communication event includes more than two users) on the basis that users A and B (102 and 112) are contacts of one another in the second communication system 122.

Communications over the first communication system 120 allow for privacy settings to be implemented. For example, the user 102 may define who is allowed to communicate with him over the first communication system 120, and/or in what way they are allowed to communicate. These privacy settings may be user-defined preferences which can be set by the user 102 using the client 106. As described above, the first communication system 120 requires a contact relationship to exist between users in order to authorise them to communicate with each other over the first communication system 120. The requirement of a contact relationship may be a user-defined preference, e.g. that the user 102 can set in the client 106 (or that the user 112 can set in the client 116). According to methods described herein the users 102 and 112 can communicate with each other over the first communication system 120 even though the users 102 and 112 are not contacts of each other within the first communication system 120. Instead, the authorisation required by the first communication system 120 is based on the contact relationship between the users 102 and 112 within the second communication system 122. The client 106 authorises communication events to proceed over the first communication system 120 between the clients 106 and 116 (and any other clients involved in the communication event when the communication event includes more than two users) on the basis that users A and B (102 and 112) are contacts of one another in the second communication system 122. As described above, the client 116 also authorizes the communication events to proceed over the first communication system 120 in a corresponding way.

In some embodiments, although the communication event occurs over the first communication system 120 (in which the users 102 and 112 are not contacts of one another) the client 106 displays information regarding the communication event to the user 102 in a manner as if the communication event is with the contact in the second communication system 122 having the identity $ID_{2B}$. In other words, it appears to the user 102 that he is engaged in a communication event with the contact identity ($ID_{2B}$) of the user 112 in the second communication system 122, with whom the user 102 is a contact within the second communication system 122. Similarly, the communication client 116 displays information regarding the communication event to the user 112 in a manner as if the communication event is with the contact in the second communication system 122 having the identity $ID_{2A}$. In other words, it appears to the user 112 that he is engaged in a communication event with the contact identity ($ID_{2A}$) of the user 102 in the second communication system 122, with whom the user 112 is a contact within the second communication system 122. In this way, the user 102 can engage in a communication event with the user 112 as though the communication event is over the second communication system 122 even though, in fact, the communication event is implemented over the first communication system 120.

In the methods described herein, the user 102 does not have to add each identity of the user 112 to his contact list(s). Therefore, user 102 does not need to have several entries of the user 112 in his contact list(s), and is still able to communicate with the user 112 over both the first and second communication systems 120 and 122.

The users 102 and 112 are not required to perform a step of adding each other as contacts in the first communication system 120 before they can communicate with each other over the first communication system 120. If, as in previous systems, the user 102 had to add the user 112 as a contact within the first communication system 120, then he would have to send the authorization request and wait for the answer before being able to communicate with the user 112 over the first communication system 120.

There is therefore described herein a communication policy that permits actions from an anonymous user (e.g. user 102) of the communication system 120 provided the anonymous user is associated with a contact on the communication system 122.

There is now described an example scenario in which it is not necessary for the users 102 and 112 to have previously defined IDs in the first communication system 120 for the methods described herein to be implemented. Users 102 and 112 are contacts within the second communication system 122, and then they both download and install the respective clients 106 and 116 for accessing the first communication system 120. They have not used the first communication system 120 before and they do not have an ID in the first communication system 120 nor a pre-existing relationship in the first communication system 120 (i.e. they are not contacts of one another with the first communication system 120). However, as they are contacts within the second communication system 122 they would like features to still work within the first communication system (without being required to first add each other as contacts within the first communication system).

The user 102 may log in to the first communication system 120 using details (e.g. email address, or some other identifier) which can be used to link the user's account in the first communication system 120 to his account in the second communication system 122. For example, the ID of the user 102 in the second communication system 122 may be the email address of the user 102. The user 102 may log in for the first time to the first communication system 120 using the client 106 and providing details such as his email address to identify himself. The email address may be used to link the account in the first communication system 120 to the user's account in the second communication system 122. The user 102 may be given the option to link his account in the second communication system 122 with an existing account in the first communication system 120. If he doesn't do that, an account in the first communication system 120 is automatically created for him, thereby creating an ID for the user 102 in the first communication system 120 (called the technical identity). The ID of the user 102 in the first communication system 120 is then linked with the ID of the user 102 in the second communication system 122, thereby determining the association between the IDs, as described above in relation to step S302.

The same applies to the user 112. That is, when the user 112 logs in for the first time to the first communication system 120 (e.g. using an email address of the user 112) using the client 116, he is given the option to link his account in the second communication system 122 with an existing account in the first communication system 120. If he doesn't do that, an account in the first communication system 120 is automatically created for him, thereby creating an ID for the user 112 in the first communication system 120 (called the technical identity). The ID of the user 112 in the first communication system 120 is then linked with the ID of the user 112 in the second communication system 122, thereby determining the association between the IDs, as described above in relation to step S302.

Therefore, in this way IDs of the users 102 and 112 in the first communication system 120 are linked to the IDs of the users 102 and 112 in the second communication system 122.

When the client 106 is to send a setup request to establish a communication event over the first communication system 120 between the users 102 and 112, the client 106 (i.e. the sender side) needs to know the ID in the first communication system 120 (that is, $ID_{1B}$) corresponding to the ID of the user 112 in the second communication system 122 (that is, $ID_{2B}$) with whom the user 102 is a contact in the second communication system 122. This ID ($ID_{1B}$) is provided to, or determined by, the client 106 as described above in relation to step S306. This could be provided from the contact list server 128. The server 128 may be arranged to store, in the data store 130, an associated ID in the first communication system 120 for every ID in the second communication system 122 where the respective user has linked his accounts or downloaded a new client. Alternatively the ID of user B 112 in the first communication system 120 (that is, $ID_{1B}$) may be provided in a presence document provided from the server 128 to the client 118.

The user 102 may then establish a call or other communication event from the client 106 using the ID of the second user 112 in the first communication system 120 ($ID_{1B}$) to contact the second user 112.

On the receiver side, the client 116 needs to know that the incoming setup request received from the ID of user A 102 in the first communication system 120 ($ID_{1A}$) is from a contact of the user 112 within the second communication system 122. To achieve this, the ID of user A 102 in the second communication system ($ID_{2A}$) may be included in the setup request. Alternatively the ID of user A 102 in the second communication system ($ID_{2A}$) may be resolved using the associations between IDs provided in a presence document from the server 128 to the client 118, or the user device 114 may query the server 128 (e.g. using the client 118) to retrieve the associations between the IDs.

Once the recipient client 116 has determined that the sender client 106 is associated with a trusted contact on the second communication system 122 the client 116 will treat the sender (user 102) as a trusted contact for the purpose of applying any privacy policy and optionally displaying messages in a manner associated with a trusted user.

Each of the associations which is determined and stored in step S302 may be stored for the duration for which the respective user is online in both the first and second communication systems 120 and 122. This allows a long-term association between the IDs in the different communication systems, which can be used to establish multiple communication events between the users 102 and 112 over the first communication system 120 based on the contact relationship between the users 102 and 112 in the second communication system 122. This allows the users 102 and 112 to act as if they are contacts within the first communication system 120 even though there are not contacts within the first communication system 120. As described above, the determined associations may be stored in the data store 130, the data store 126, in memory 218 at the user device 104 and/or in a memory at the user device 114. While the users are online in both the first and second communication systems 120 and 122 they are authorized to communicate with each other over the first communication system 120 based on their contact relationship in the second communication system 122.

Alternatively, the associations which are determined and stored in step S302 may be stored for the duration of the communication event, wherein responsive to the end of the communication event the associations are no longer stored. In this way, the association is a short-term association between the IDs in the different communication systems, which can be used to establish a single communication event between the users 102 and 112 over the first communication system 120. For example, the server 128 may issue a token which authorises communication between the users 102 and 112 over the first communication system 120 for the purposes of a single communication event, e.g. a single call. The token is provided to the user device 104 and then the client 106 includes the token in the setup request that is sent to the client 116 to establish the communication event (in step S308). The token is also sent to the user device 114. The token is either pushed to the user device 114 from the server 128, or the token may be retrieved from the server 128 by the user device 114 (i.e. pulled from the server 128) responsive the client 116 receiving the setup request from the client 106 in step S308. If the token received in the setup request matches that obtained from the server 128 then the client 116 allows the communication event to proceed over the first communication system 120.

In the embodiments described above, both of the communication systems 120 and 122 are accessed using respective clients implemented at the devices 104 and 114. However, in other embodiments one or more of the communication systems 120 and 122 may comprise a social networking website. For example, the second communication system 122 may be a social networking site and the clients 108 and 118 may be replaced in the methods described above with web-browser applications which can be used to access the social networking site. The users 102 and 112 may be contacts of one another within the social networking site. The same methods as those described above could be applied to allow the users 102 and 112 to communicate with each other over the first communication system 120 based on the contact relationship between the users 102 and 112 within the social networking site.

In the embodiments described above the clients 106 and 108 are executed on the user device 104. In other embodiments, the user device 104 may implement the clients 106 and 108 to thereby allow the user 102 to interact with the clients 106 and 108, but the clients may actually be executed elsewhere. For example, the clients may be executed in one or more servers in the network 110 and the user device 104 may execute a web browser through which the user 102 can access the clients. In this way the user device 104 may implement the clients 106 and 108 (e.g. the user interfaces of the clients may be implemented within a web browser application executing at the user device 104) without executing the clients on the CPU 202. In a similar way, the user device 114 may implement the clients 116 and 118 to allow the user 112 to access the clients 116 and 118 without actually executing the clients 116 and 118 on a CPU of the user device 114 (e.g. via a web browser executed at the user device 114).

Although in the embodiments above, the user device 104 implements both the first client 106 and the second client 108, in some embodiments, the user device 104 does not implement the second client 108. For example, the user 102 may use a different user device (that is, different to user device 104) to connect to the second communication system 122. Then, the user device 104 only needs to implement the first client 106. The first client 106 can retrieve the determined associations between the IDs of the user 112 as described above, and can send the setup request as described above for establishing a communication event over the first communication system 120, without the need to implement the second client 108 at the user device 104. Similarly, the user device 114 does not need to implement the second client 118. The association between the IDs of the user 102 in the communication systems may be determined by the client 116 at the user device 114 to authorise the communication event to proceed over the communication system 120 without the client 118 being implemented at the user device 114. In these cases, the user 112 may access the second communication system 122 via a different user device (that is, different to user device 114).

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described herein are platform-independent, meaning that the techniques may be implemented on a variety of commercial computing platforms having a variety of processors.

For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method performed by a recipient device to communicate with an initiator device via a first communication service, wherein the recipient device is associated with a recipient and the initiator device is associated with an initiator, the method comprising:
   receiving, by the recipient device, a request to establish a connection with the initiator device via the first communication service, the request including a recipient identifier of the recipient for a second communication service, and an initiator identifier of the initiator, the second communication service being different from the first communication service;
   determining, by the recipient device and from the initiator identifier, an initiator identifier for the second communication service;
   determining, by the recipient device, that a contact relationship exists between the recipient identifier for the second communication service and the initiator identifier for the second communication service;
   determining, by the recipient device, that the requested connection between the initiator device and the recipient device via the first communication service is allowed according to a privacy policy; and
   in response to determining that the connection between the initiator device and the recipient device is allowed, establishing, by the recipient device, the connection between the initiator device and the recipient device via the first communication service.

2. The method of claim 1, wherein the determining that the requested connection is allowed includes:
   determining that the requested connection specifies at least one communication method selected from an audio call, a video call, an instant messaging session, or a file transfer; and
   applying the privacy policy to determine that the specified communication method is allowed.

3. The method of claim 1, wherein:
   the initiator identifier is the initiator identifier for the second communication service; and
   the determining that the contact relationship exists between the recipient identifier for the second communication service and the initiator identifier for the second communication service includes determining that the initiator identifier for the second communication service is in a contact list for the second communication service.

4. The method of claim 1, wherein:
   the initiator identifier is an initiator identifier for the first communication service;
   the determining of the initiator identifier for the second communication service includes:
      sending the initiator identifier for the first communication service to a server; and
      receiving, from the server, the initiator identifier for the second communication service; and
   the determining that the contact relationship exists between the recipient identifier for the second communication service and the initiator identifier for the second communication service includes determining that the initiator identifier for the second communication service is in a contact list for the second communication service.

5. The method of claim 1 wherein the establishing of the connection between the initiator device and the recipient device via the first communication service includes establishing the connection using the initiator identifier for the second communication service and the recipient identifier for the second communication service.

6. The method of claim 1, wherein the establishing of the connection between the initiator device and the recipient device includes:
   in response to determining that the connection between the initiator device and the recipient device via the first communication service is allowed, retrieving a recipient identifier for the first communication service;
   sending a message including the recipient identifier for the first communication service to the initiator device; and
   receiving a further request to establish the connection with the initiator device via the first communication service, the further request including the recipient identifier for the first communication service and the initiator identifier for the first communication service.

7. The method of claim 1, wherein:
   the method further comprises, prior to receiving the request to establish the connection:
      receiving, by the recipient device, a first presence indicator including the initiator identifier for the second communication service; and
      storing, via the recipient device, the first presence indicator and a second presence indicator including the recipient identifier for the second communication service as confirmation of the contact relationship between the initiator identifier for the second communication service and the recipient identifier for the second communication service; and the determining that the contact relationship exists between the initiator identifier for the second communication service and the recipient identifier for the second communication service includes retrieving the stored first and second presence indicators.

8. The method of claim 1, wherein:

the method further comprises, prior to receiving the request to establish the connection:

receiving, by the recipient device, a presence indicator via the second communication service, the presence indicator including the initiator identifier for the second communication service; and storing, by the recipient device, the initiator identifier for the second communication service into a contact list for the second communication service; and the determining that the contact relationship exists between the initiator identifier and the recipient identifier for the second communication service includes looking up the stored initiator identifier in the contact list for the second communication service.

9. The method of claim 1, further comprising:

receiving, by the recipient device, a further request to establish a further connection with a further initiator device used by a further initiator via the first communication service, the request including the recipient identifier for the second communication service, and a further initiator identifier of the further initiator;

determining, from the further initiator identifier and by the recipient device, a further initiator identifier for the second communication service;

determining, by the recipient device, that a contact relationship exists for the second communication service between the recipient identifier for the second communication service and the further initiator identifier for the second communication service;

determining, by the recipient device, that the requested connection between the further initiator device and the recipient device via the first communication service is not allowed by the recipient device according to the privacy policy; and in response to determining that the connection between the further initiator device and the recipient device is not allowed, sending, by the recipient device, a message to the further initiator device rejecting the request to establish the further connection.

10. A method performed by an initiator device, used by an initiator, to establish a connection via a first communication service with a recipient device, used by a recipient, the method comprising:

determining, by the initiator device, that a recipient identifier of the recipient in the first communication service is not in a contact list, maintained by the initiator device, for the first communication service;

determining, by the initiator device, a recipient identifier of the recipient for a second communication service, different from the first communication service;

determining, by the initiator device, that a contact relationship exists between the initiator identifier for the second communication service and the recipient identifier for the second communication service;

determining, by the initiator device, that the connection with the recipient device via the first communication service is allowed by the recipient device by applying a privacy policy separate from the contact relationship; and in response to the determining that the connection is allowed, sending, by the initiator device and via the first communication service, a request to establish the connection with the recipient device.

11. The method of claim 10, wherein the determining that the connection is allowed includes:

determining that the request specifies at least one communication method selected from an audio call, a video call, an instant messaging session, or a file transfer; and applying the privacy policy to determine that the specified communication method is allowed.

12. The method of claim 10, wherein the determining that the contact relationship exists between the initiator identifier for the second communication service and the recipient identifier for the second communication service includes determining that the recipient identifier for the second communication service is a contact in a contact list for the second communication service.

13. The method of claim 10, wherein the sending of the request to establish the connection with the recipient device includes:

receiving a recipient identifier for the first communication service; and sending, via the first communication service, the request to establish the connection with the recipient device, the request including the recipient identifier for the first communication service.

14. The method of claim 10, further comprising attempting to establish a further connection with a further recipient device used by a further recipient, the method comprising:

determining, via the initiator device, that a further recipient identifier of the further recipient in the first communication service is not in the contact list, maintained by the initiator device, for the first communication service;

determining, by the initiator device, a further recipient identifier of the further recipient for the second communication service;

determining, by the initiator device, that a contact relationship exists between the initiator identifier for the second communication service and the further recipient identifier for the second communication service;

determining, by the initiator device, that the further connection with the further recipient device via the first communication service is not allowed by the further recipient by applying the privacy policy; and in response to the determining that the further connection is not allowed terminating, by the initiator device, the attempt to establish the further connection.

15. An apparatus for use in a recipient device, used by a recipient, the apparatus comprising:

a memory containing instructions; and a central processing unit (CPU) coupled to a network interface and to the memory, the instructions causing the CPU to perform operations comprising:

receiving, from the network interface, a request to establish a connection, via a first communication service, with an initiator device used by an initiator, the request including a recipient identifier of the recipient for a second communication service and an initiator identifier of the initiator for the first communication service, the second communication service being different from the first communication service;

determining, from the initiator identifier for the first communication service, an initiator identifier for the second communication service;

determining that a contact relationship exists between the recipient identifier for the second communication service and the initiator identifier for a second communication service;

determining that the requested connection between the initiator device and the recipient device via the first communication service is allowed by applying a privacy policy; and in response to determining that the connection between the initiator device and the recipient device is allowed, causing the network interface to establish the connection between the initiator device and the recipient device via the first communication service.

16. The apparatus of claim 15, wherein the determining that the requested connection is allowed includes:

determining that the requested connection specifies at least one communication method selected from an audio call, a video call, an instant messaging session, or a file transfer; and applying the privacy policy to determine that the specified communication method is allowed.

17. The apparatus of claim 15, wherein:

the initiator identifier is the initiator identifier for the second communication service; and the determining that the contact relationship exists between the recipient identifier for the second communication service and the initiator identifier for the second communication service includes determining that the initiator identifier for the second communication service is in a contact list for the second communication service.

18. The apparatus of claim 15, wherein:

the initiator identifier is an initiator identifier for the first communication service;

the determining of the initiator identifier for the second communication service includes:

sending the initiator identifier for the first communication service to a server; and receiving, from the server, the initiator identifier for the second communication service; and the determining that the contact relationship exists between the recipient identifier for the second communication service and the initiator identifier for the second communication service includes determining that the initiator identifier for the second communication service is in a contact list for the second communication service.

19. The apparatus of claim 15 wherein the establishing of the connection between the initiator device and the recipient device via the first communication service includes establishing the connection using the initiator identifier for the second communication service and the recipient identifier for the second communication service.

20. The apparatus of claim 15, wherein the causing of the network interface to establish the connection between the initiator device and the recipient device includes:

in response to determining that the connection between the initiator device and the recipient device via the first communication service is allowed, retrieving a recipient identifier for the first communication service;

sending, via the network interface, a message including the recipient identifier for the first communication service to the initiator device; and receiving, from the network interface, a further request to establish the connection with the initiator device via the first communication service, the further request including the recipient identifier for the first communication service and the initiator identifier for the first communication service.

21. The apparatus of claim 15, wherein:

the operations further comprise, prior to receiving the request to establish the connection:

receiving, from the network interface, a first presence indicator including the initiator identifier for the second communication service;

storing, in the memory, the first presence indicator and a second presence indicator including the recipient identifier for the second communication service as confirmation of the contact relationship between the initiator identifier for the second communication service and the recipient identifier for the second communication service; and the determining that the contact relationship exists between the initiator identifier for the second communication service and the recipient identifier for the second communication service includes retrieving the stored first and second presence indicators from the memory.

22. The apparatus of claim 15, wherein:

the operations further comprise, prior to receiving the request:

receiving, via the network interface, a presence indicator via the second communication service, the presence indicator including the initiator identifier for the second communication service; and storing the initiator identifier for the second communication service into a contact list for the second communication service stored in the memory; and the determining that the contact relationship exists between the initiator identifier and the recipient identifier for the second communication service includes retrieving, the stored initiator identifier from the contact list for the second communication service stored in the memory.

23. The apparatus of claim 15, wherein the instructions cause the CPU to perform further operations comprising:

receiving, from the network interface, a request to establish a further connection, via the first communication service, with a further initiator device used by a further initiator, the request including the recipient identifier of the recipient for the second communication service and a further initiator identifier of the further initiator in the first communication service;

determining, from the further initiator identifier, a further initiator identifier for the second communication service;

determining that a contact relationship exists between the recipient identifier for the second communication service and the further initiator identifier for the second communication service;

determining that the requested connection between the further initiator device and the recipient device via the first communication service is not allowed by applying the privacy policy; and in response to determining that the connection between the further initiator device and the recipient device is not allowed, causing the network interface to send a message to the further initiator device rejecting the request to establish the further connection.

24. An apparatus for use by an initiator device to establish a connection with a recipient device via a first communication service, wherein the initiator device is associated with an initiator and the recipient device is associated with a recipient, the apparatus comprising:
- a memory containing instructions; and
- a central processing unit (CPU) coupled to the memory, the instructions causing the CPU to perform operations comprising:
  - determining that a recipient identifier of the recipient in the first communication service is not in a contact list, maintained by the initiator device, for the first communication service;
  - determining a recipient identifier of the recipient in a second communication service, different from the first communication service;
  - determining that a contact relationship exists between the initiator identifier for the second communication service and the recipient identifier for the second communication service;
  - determining that the connection with the recipient device via the first communication service is allowed by applying a privacy policy for the initiator device; and
  - in response to the determining that the connection is allowed, causing a network interface to send, via the first communication service, a request to establish the connection with the recipient device.

25. The apparatus of claim 24, wherein the determining that the connection is allowed includes:
- determining that the request specifies at least one communication method selected from an audio call, a video call, an instant messaging session, or a file transfer; and
- applying the privacy policy to determine that the specified communication method is allowed.

26. The apparatus of claim 24, wherein the determining that the contact relationship exists between the initiator identifier for the second communication service and the recipient identifier for the second communication service includes determining that the recipient identifier for the second communication service is a contact in a contact list for the second communication service.

27. The apparatus of claim 24, wherein the causing of the network interface to send the request to establish the connection with the recipient device includes:
- receiving, via the network interface, a recipient identifier for the first communication service; and
- causing the network interface to send, via the first communication service, the request to establish the connection with the recipient device, the request including the recipient identifier for the first communication service.

28. The apparatus of claim 24, wherein the instructions further cause the CPU to perform further operations to attempt to establish a further connection with a further recipient device used by a further recipient, the further operations comprising:
- determining that a further recipient identifier of the further recipient in the first communication service is not in the contact list, maintained by the initiator device, for the first communication service;
- determining a further recipient identifier of the further recipient for the second communication service, different from the first communication service;
- determining that a contact relationship exists between the initiator identifier for the second communication service and the further recipient identifier for the second communication service;
- determining that the further connection with the further recipient device via the first communication service is not allowed by the further recipient device by applying the privacy policy; and
- in response to the determining that the further connection is not allowed terminating the attempt to establish the further connection.

* * * * *